March 31, 1931.  W. H. J. FITZGERALD  1,798,526
FASTENING DEVICE
Filed Sept. 28, 1929

INVENTOR:
William H. J. Fitzgerald
BY John E. R. _____
ATTORNEY:

Patented Mar. 31, 1931

1,798,526

UNITED STATES PATENT OFFICE

WILLIAM H. J. FITZGERALD, OF BRAINTREE, MASSACHUSETTS, ASSIGNOR TO KATCHES, INC., OF BOSTON, MASSACHUSETTS, A CORPORATION OF MASSACHUSETTS

FASTENING DEVICE

Application filed September 28, 1929. Serial No. 395,925.

The invention relates to an improvement in that type of fastening device comprising a shank having at one end a head by which the shank may be turned, and at its opposite end a crossbar, and which device is used for fastening together separate apertured parts by passing the shank and crossbar through the apertures in the separate parts until the crossbar has passed beyond the aperture in the inner one of the parts after which the fastening is completed by the turning of the shank through application of force to the head of the fastening with the effect of turning the crossbar on the inner end of the shank crosswise the aperture in the inner one of the combined parts, which completes the fastening.

In order that the combined parts may be held snugly together when the fastening is completed a coiled spring is sometimes arranged upon the shank beneath the head, and this spring, interposed between the head and the outer one of the combined parts, is tensioned by the drawing engagement of the head as the device is applied to the combined parts, the tensioning of the spring continuing after the fastening has been completed. A washer has also been sometimes employed against which the inner end of the spring has bearing, and which washer has bearing against the outer one of the combined parts when the fastening has been completed.

One difficulty in the use of a fastening of the above character resides in its lack of stability when the device is being applied to the separate parts for fastening them together. The spring used is generally one which can be tensioned only by an application of considerable force which is applied through the head of the shank which is a slotted head like the head of a screw. In consequence when force is applied to the head to distort the spring on application of the device to the parts to be combined, the tendency is to laterally upset the shank unless it be held rigidly in a vertical position which is a rather difficult thing to do.

The essential object of the invention is to provide means whereby the shank will be held stable in vertical position during the application of the device to the separate parts to be combined and during all the time that force is being applied to the head of the device for distorting the spring. My invention further contemplates the idea of making the device as simple and with as few parts as possible.

The invention can best be seen and understood by reference to the drawings, in which—

Fig. 4 shows in side elevation and section a detail of construction later to be referred to.

Referring to the drawings:—

Figure 1:
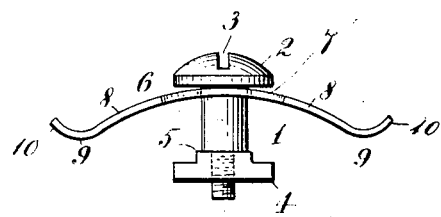
Figure 1 is a side elevation of the device.
Figure 2:
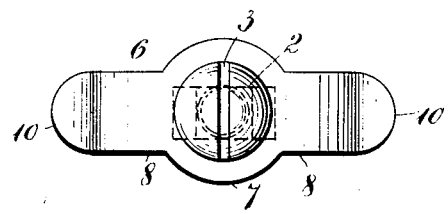
Fig. 2 is a plan.

1 represents the shank of the device. This shank is preferably cylindrical in form and its length depends upon the number and thickness of the parts to be fastened together by the device. 2 represents the head at one end of the shank. This head is preferably like the head of a round-headed screw and is provided with a slot 3 in its outer side or face by which the head and shank may be turned. At its opposite end the shank is provided with a crossbar 4. This bar is preferably rectangular in form. Associated with the crossbar and preferably formed integral with it is a keeper 5 which is adapted to hold the crossbar in locking position, as will later be explained.

Arranged upon the shank of the device between its head and keeper is a combination spring and washer member 6. This member is arcuate in form of generally flat metal or plate. It comprises a central body portion 7 with an opening in it through which the shank extends, and extending laterally from opposite sides of this body portion are bent wing-forming extensions 8, 8 which together with the body give a general arcuate or bow-shaped form to the member. The outer end portions of the extensions 8, 8 present relatively wide end bearings 9, 9 beyond which the extensions are preferably provided with upturned tips 10.

Figure 3:
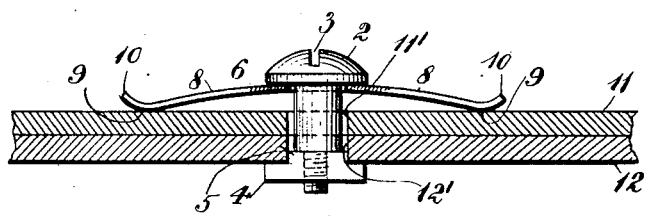
Fig. 3 is a cross section of the device in place fastening together separate apertured parts.

The general operation is as follows: It will first be assumed that 11 and 12 represent, respectively, the parts to be fastened together, and 11', 12' aligned apertures in these respective parts. The device is applied to these apertured parts for the purpose of fastening them together by first passing the crossbar 4 borne by the shank 1 through the aperture in the outer one of the apertured parts and thence through the aperture in the inner one of the parts. During the passage of the crossbar through these apertures the end bearings 9, 9 of the combination spring and washer member 6 will be brought into engagement with the outer face of the outer one of the apertured parts at points relatively widely separated from one another, and by such engagement the member 6 will be maintained in stable position against lateral displacement. At this same time the head of the device will be bearing against the outer face of the central or body portion 7 of the member 6 which, on account of its stability, will provide a centering support for the shank and head of the device when force is applied to the head, as by a driving instrument, for tensioning the member 6 and driving the crossbar 4 and keeper 5 through and beyond the aperture in the inner one of the apertured parts so that the crossbar may be turned into a position crosswise the aperture in the inner part and the keeper then allower to enter said aperture for holding the crossbar in place. Inasmuch as the member 6 is preferably of relatively heavy spring metal, considerable force must necessarily be brought to bear upon the head of the device to distort the member sufficiently to bring the crossbar into its locked position, but such force can readily be applied without a tendency for lateral displacement of the head and shank owing to the fact that they are being supported at all times by the member 6 and even more securely when this member becomes highly tensioned. On completion of the fastening its elements assume a position substantially as shown in Fig. 3 where the tension member 6 functions also as a washer interposed between the head of the device and the face of the outer one of the combined parts.

Figure 4:
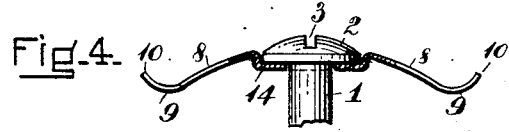

In Fig. 4 a slight modification is shown in that the central or body portion 7 of the member 6 through which the shank extends is upset to provide a socket 14 within which the head of the device may be contained. This adds to the finish of the device when in locking position. The general form of the member 6 consisting as it does of a plate permits of the formation of said head-receiving socket. In other respects this modified structure functions the same as before.

Having thus fully described my invention, I claim and desire to secure by Letters Patent of the United States:—

1. In a fastening device having a shank, a head on the shank at one end and a crossbar on the shank at its opposite end for fastening together separate apertured parts by passing the shank and crossbar through the apertures in said separate parts and turning the head and crossbar to extend crosswise the aperture in the inner one of said parts, the combination therewith of an arcuate combination spring and washer member having an opening in it through which the shank extends and against which spring the head bears, said member being provided with bent wing-forming extensions in opposite directions to have bearing by flattened spaced ends against the outer one of said apertured parts on applying the fastening device thereto whereby said member will provide stable bearing for said head for holding the shank and head in proper upright position during the application of the device to said separate parts for fastening them together as aforesaid.

2. A fastening device as in claim 1 but in which the combination spring and washer member is provided with a socket in which the head lies socketed on the completion of the fastening.

WILLIAM H. J. FITZGERALD.